United States Patent
Andersson

(10) Patent No.: US 12,544,182 B2
(45) Date of Patent: Feb. 10, 2026

(54) SUPPORT AND HOLDER FOR NAVIGATION SYSTEM

(71) Applicant: Ortoma AB, Gothenburg (SE)

(72) Inventor: Morgan Andersson, Häggenås (SE)

(73) Assignee: Ortoma AB, Gothenburg (SE)

( * ) Notice: Subject to any disclaimer, the term of this patent is extended or adjusted under 35 U.S.C. 154(b) by 431 days.

(21) Appl. No.: 18/017,146

(22) PCT Filed: Jul. 19, 2021

(86) PCT No.: PCT/SE2021/050740
§ 371 (c)(1),
(2) Date: Jan. 20, 2023

(87) PCT Pub. No.: WO2022/019820
PCT Pub. Date: Jan. 27, 2022

(65) Prior Publication Data
US 2023/0255721 A1 Aug. 17, 2023

(30) Foreign Application Priority Data

Jul. 20, 2020 (SE) .................................. 2050911-3

(51) Int. Cl.
*A61B 90/00* (2016.01)
*A61B 34/20* (2016.01)

(52) U.S. Cl.
CPC ...... *A61B 90/39* (2016.02); *A61B 2034/2055* (2016.02); *A61B 2034/2072* (2016.02); *A61B 2090/3983* (2016.02)

(58) Field of Classification Search
CPC ............ A61B 90/39; A61B 2034/2055; A61B 2034/2072; A61B 2090/3983; A61B 90/50; A61B 34/20
See application file for complete search history.

(56) References Cited

U.S. PATENT DOCUMENTS

| | | |
|---|---|---|
| 2007/0208352 A1 | 9/2007 | Henderson et al. |
| 2008/0051797 A1 | 2/2008 | Surma et al. |
| 2015/0282735 A1 | 10/2015 | Rossner |
| 2015/0297314 A1 | 10/2015 | Fowler et al. |

FOREIGN PATENT DOCUMENTS

| | | | |
|---|---|---|---|
| EP | 2233099 A2 | 7/2017 | |
| FR | 2998471 A3 * | 5/2014 | ............. A61B 90/39 |

OTHER PUBLICATIONS

International Search Report and Written Opinion in connection with PCT/SE2021/050740 filed Jul. 19, 2021.
European Supplementary Search Report dated Jun. 26, 2024, in connection with EP21846819.

* cited by examiner

*Primary Examiner* — Richard G Louis
(74) *Attorney, Agent, or Firm* — Downs Rachlin Martin PLLC

(57) ABSTRACT

A support (1) for at least one marker for a navigation system is disclosed. The support (1) comprises a body (2) having at least one region for the at least one marker, and a hub (4) for attaching the support (1) to a holder. The hub (4) comprises at least one reference surface (6) located at a first end of the hub (4), at least one deflectable element (7) at a second end of the hub (4), at least one support guide surface (8) extending at least partially between the reference surface (6) and the deflectable element (7), and a snap-fit feature (9) located at the deflectable element (7). A holder (20) for the support (1) is also disclosed.

19 Claims, 3 Drawing Sheets

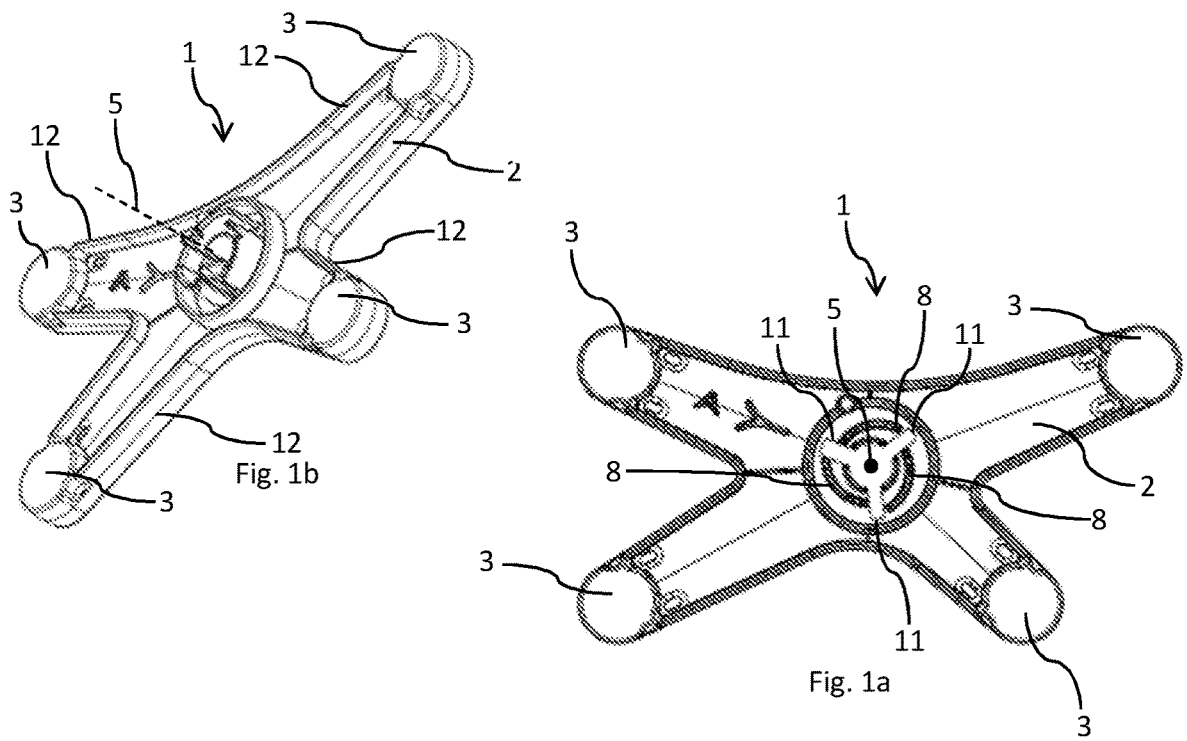
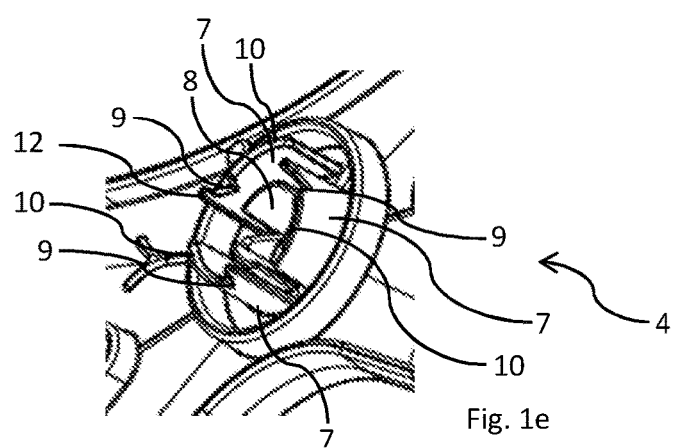

SUPPORT AND HOLDER FOR NAVIGATION SYSTEM

FIELD OF THE INVENTION

Embodiments of the application pertains in general to the field of navigation systems, such as optical surgical navigation systems. More particularly, the invention relates to a support for at least one marker for a navigation system. The support comprises a body having at least one region for said at least one marker, and a hub for attaching said support to a holder. The hub comprises at least one reference surface, at least one deflectable element, at least one guide surface, and a snap-fit feature. The hub may comprise a central longitudinal axis defining an axial direction of the hub. The at least one reference surface may be located at a first end of the hub, and/or may be radially positioned a first distance from the central longitudinal axis. The at least one deflectable element may be located at a second end of the hub and/or may be radially positioned a second distance from the central longitudinal axis. The at least one guide surface may be extending at least partially between the reference surface and the deflectable element. The snap-fit feature may be located at the deflectable element.

Embodiments of the application also relates to a holder, such as for the support. The holder comprises a ledge, which may be extending in a radial or transverse direction of the holder, at least one arm, which may be extending in the radial or transverse direction of the holder, and a guide surface, which may be extending at least partially between the ledge and the arm. The arm may comprise a sliding surface that may be inclined in a non-perpendicular direction relative to an axial direction of the holder. The arm may be spaced apart from the ledge.

BACKGROUND OF THE INVENTION

Navigation systems, such as optical navigations systems can be used to indicate positions or to track objects in space. For example, optical navigation systems can comprise a camera system projecting IR light onto reflective markers. The reflective markers can comprise retroreflective material to reflect the projected light. The camera system can capture the reflected light and determine the position of the marker. A single marker can be used to indicate a position in space. A plurality of markers having a fixed and pre-determined pattern can be used to track various objects in space in six degrees of freedom. Active optical navigation systems use active markers, wherein the marker projects light, such as by an LED, which the camera system can detect.

Optical navigation systems can be used in a variety of applications, such as for assembly of parts with high accuracy, e.g. in automotive, aerospace, and medical applications. For example, in medical applications, optical navigation systems can be used for tracking instruments, and/or positioning medical equipment during surgery.

It is known to use passive retroreflective markers for various applications. In some applications spheres are detachably mounted to a support, which in turn can be attached to or be integrated with an instrument or tool. The detachable support commonly has a plurality of posts in a predetermined pattern, to which the spheres are mounted using a thread or an annular snap-fit connection. Other systems use disc shaped markers. Common to such systems are that a plurality of markers, often at least four, have to be mounted to the support to track an object with six degrees of freedom. This can be time consuming. Particularly, in medical applications the markers need to be sterile if used in surgery. For such applications, the markers are either single-use disposable, or sterilizable. If sterilizable, the markers need to be disassembled from the support after use in order to allow sufficient washing and sterilization before the next surgery. Before each surgery, the markers have to be attached to the support.

The accuracy of the navigation systems is normally in the sub-millimeter range. Therefore, the markers, such as the reflective spheres or discs, have to be attached to the support with great accuracy, and the support needs to be attached to another device in a stable way to not deteriorate accuracy during use.

Assembling the markers to the support adds time to preparation for using the navigation system, which should be reduced to a minimum in most applications. In medical applications, time is scarce and the time available to assemble components for the optical navigation system is limited. Furthermore, there is a need to attach the support to other devices in a stable fashion.

SUMMARY OF THE INVENTION

It is desired to reduce the time needed for assembling the components of a navigation system. Particularly, it is desired to provide a support that can be quickly attached to another component in a stable fashion. It is also desired to provide a holder, to which such a support can be quickly attached in a stable fashion.

Accordingly, embodiments of the present inventions preferably seek to mitigate, alleviate or eliminate one or more deficiencies, disadvantages or issues in the art, such as the above-identified, singly or in any combination by providing the support and the holder according to the appended patent claims.

According to an embodiment, a support for at least one marker for a navigation system, comprises a body having at least one region for said at least one marker, and a hub for attaching said support to a holder. The hub comprises a central longitudinal axis defining an axial direction of the hub, at least one reference surface located at a first end of the hub and radially positioned a first distance from the central longitudinal axis, at least one deflectable element at a second end of the hub and radially positioned a second distance from the central longitudinal axis, at least one guide surface extending at least partially between the reference surface and the deflectable element, and a snap-fit feature located at the deflectable element.

The deflectable element may have a base and a free end. The base may be connected to the body, and the deflectable element may extend in the axial direction of the hub.

The height of the deflectable element, measured in the axial direction of the hub from the base to the free end, may be varying in the tangential direction of the hub.

A free end of the deflectable element may be positioned at least partially eccentrically around the central longitudinal axis.

A top surface of the free end may be inclined towards the reference surface and towards the central longitudinal axis, such as inwardly towards the central longitudinal axis and towards the reference surface.

The snap-fit feature may comprise a depression, such as a v-shaped depression.

The first distance may be different from the second distance. The first distance may be smaller than the second distance.

The guide surface may comprise a first portion and a second portion. The first portion may have a cylindrical cross-section in the axial direction of the hub. The second portion may have a conical cross-section in the axial direction of the hub.

The hub may comprise at least one slot having an open end towards the central longitudinal axis and having a closed end towards a periphery of the hub. The closed end may be located closer to the periphery of the hub than at least a portion of the deflectable element.

The body may comprise a plurality of arms positioned around the hub. Each arm may have a region for a marker.

According to an embodiment, a holder, such as for embodiments of the support, comprises a ledge extending in a transverse direction of the holder, at least one arm extending in the transverse direction of the holder, and a guide surface extending at least partially between the ledge and the arm. The arm is spaced apart from the ledge, and the arm comprises a sliding surface that is inclined in a non-perpendicular direction relative to an axial direction of the holder.

The sliding surface may be rounded in the tangential direction of the holder.

The arm may have a base and a free end, and the sliding surface may extend at least partially between the base and the free end and may have a first region and a second region. The first region may be located closer to the base than the second region. A first axial distance, measured from a distal part of the first region to the ledge, may be shorter than a second axial distance, measured from a distal part of the second region to the ledge.

The sliding surface may have a crest forming the distal part of the first region and the distal part of the second region. The crest may be substantially straight between the first region and the second region and may be inclined relative to the transverse direction of the holder.

Further embodiments of the invention are defined in the dependent claims.

Embodiments of the invention provide for a support for markers of a navigation system that can be assembled in a stable fashion with another device. Markers for a navigation system may be attached to the support such that multiple markers can be fixed to other instruments with a single assembly component, which makes the assembly simpler and faster. For example, the support can be assembled with the holder without changing grip with the hand. Hence, a single component is handled to attach multiple markers, and yet the connection between the components is stable. Further advantages of embodiments are described below.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the inventions are capable of will be apparent and elucidated from the following description of embodiments of the present inventions, reference being made to the accompanying drawings, in which FIG. 1a is a top view illustrating embodiments of a support;

FIG. 1b is a top perspective view of the support of FIG. 1a;

FIG. 1c is a bottom view of the support of FIG. 1a;

FIG. 1e is a sectional perspective view illustrating embodiments of a hub;

DESCRIPTION OF EMBODIMENTS

Figure 1D:
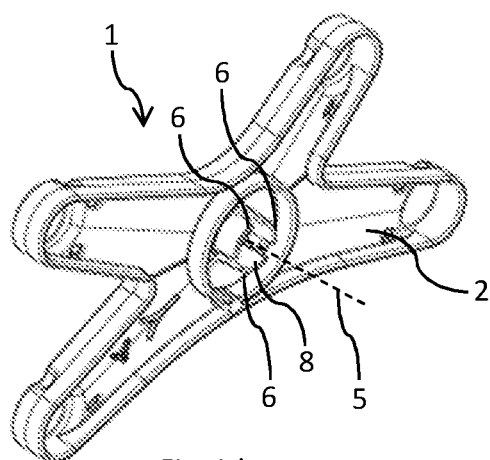
FIG. 1d is a bottom perspective view of the support of FIG. 1c.

Specific embodiments of the inventions will now be described with reference to the accompanying drawings. The inventions may, however, be embodied in many different forms and should not be construed as limited to the embodiments set forth herein; rather, these embodiments are provided so that this disclosure will be thorough and complete, and will fully convey the scope of the inventions to those skilled in the art. The terminology used in the detailed description of the embodiments illustrated in the accompanying drawings is not intended to be limiting of the inventions. In the drawings, like numbers refer to like elements.

The following description focuses on embodiments of the present inventions applicable to surgical navigation systems, wherein not only accuracy is of importance but also easy assembly to accommodate the limited time available to prepare for a surgery. However, it will be appreciated that the inventions are not limited to this application but may be applied to many other procedures, such as in for part assembly processes, inspection processes and measurement processes etc.

In various embodiments, the present inventions may include one or several components and elements having the same structure. Therefore, in the drawings, components having the same structure are denoted with the same reference numeral. However, it should be appreciated that the not all components illustrated are included in all embodiments. In the following description, one of the components of the embodiments will be described, and additional effects of embodiments including more than one structure are described to elucidate effects achieved by the combination.

FIGS. 1a-1e illustrates a support 1 for at least one marker for a navigation system, and FIGS. 2a-2e illustrates a holder 20, such as for the support 1. The support 1 and the holder 20 can be produced and delivered separately. For example, the support 1 may be a pre-sterilized single use component, whereas the holder 20 may be a multiple use re-sterilizable component. In the following, the support 1 will be described first, followed by the holder 20, and finally aspects of the assembly and the assembly process including the support 1 and the holder 20.

The Support

The support 1 can be used for attaching a marker for a navigation system in a fixed location. The support 1 can be produced separately from the marker, such as by milling or injection molding. The marker may be an optical component, such as a passive retro-reflective material or an active LED. The support 1 may comprise one or several markers depending on the number of degrees of freedom the support is supposed to track. After the marker has been attached to the support 1, the assembly can be placed in a package, sterilized, and delivered for use in a sterile environment. The marker can be permanently attached to the support 1, such as by gluing. Hence, a user of the support does not have to handle the marker. This is particularly useful when multiple markers are used, wherein multiple markers can be attached to another device by handling only the support 1. For example, with embodiments of a support 1 having three or more markers, such as four to six markers, all markers can be assembled with in a stable fashion in a single assembly step. This significantly reduces the time needed to attach markers to other devices, such as instruments, yet in a stable fashion with the support 1 of the embodiments. In surgical situations, instruments can be tracked using navigations systems, such as optical navigation systems. The time available for 30 preparing for the surgery is scarce. Hence, the ability to attach multiple markers to the instruments with a single support 1 is particularly useful in such situations. Furthermore, easy handling is important in surgical situations since the surgical staff wear protective clothing and gloves. Hence, attaching multiple markers with a single support 1 is advantageous also for this reason. Further advantages of the support 1 and holder 20 according to the inventions will be elucidated in the following.

The embodiments of the support 1 illustrated in FIGS. 1*a*-1*e* comprise a body 2 having at least one region 3 for at least one marker. In the illustrated embodiments, the support 1 comprises four regions 3 for markers, but may comprise fewer or more than four regions 3 for markers. In the illustrated embodiments, the regions 3 for markers are placed in a single plane and with a predetermined fixed pattern enabling tracking the support 1 with markers attached for up to six degrees of freedom with high accuracy.

Figure 1C:
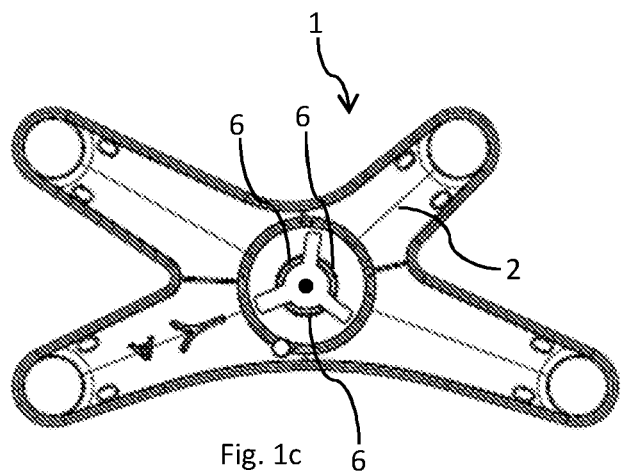
Figure 2A:
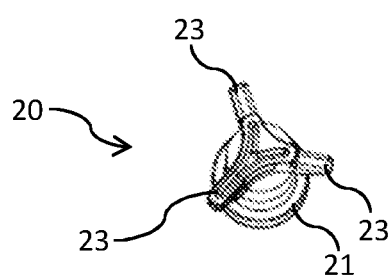
FIG. 2a is a top perspective view illustrating embodiments of a holder.
Figure 2B:
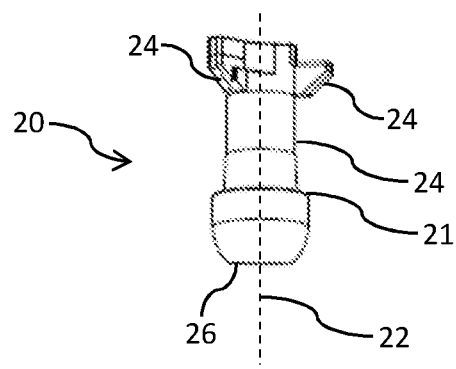
FIG. 2b is a side view of the holder of FIG. 2a from a first viewing direction.
Figure 2C:
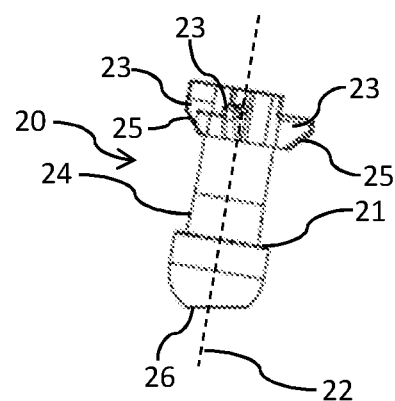
FIG. 2c is a side view of the holder of FIG. 2a from a second viewing direction rotated 90 degrees relative to the side view of FIG. 2b.

FIG. 1*e* illustrates various details of a hub 4 for attaching the support 1 to the holder 20 (FIGS. 2*a*-2*c*). The hub 4 comprises a central longitudinal axis 5 (FIGS. 1*a*-1*d*) defining an axial direction of the hub 4. A transverse axis (not indicated in the drawings) is perpendicular to the central longitudinal axis 5.

As can be seen in FIGS. 1*c*-1*d*, the hub 4 comprises at least one reference surface 6 that is located at a first end of the hub 4 and is radially positioned a first distance from the central longitudinal axis 5. The first end of the hub 4 may be a bottom or distal end of the support 1. The reference surface 6 may have an extension or width in the transverse direction of the hub 4 and extend at least partially around the central longitudinal axis 5. The reference surface 6 provides a fixed predetermined position of the support 1 relative to which other elements, such as the regions 3, can be positioned.

As can be seen in FIGS. 1*a*-1*b* and 1*e*, the hub 4 comprises at least one deflectable element 7 that is located at a second end of the hub 4 and that is radially positioned a second distance from the central longitudinal axis 5. The second end of the hub 4 may be a top end or proximal end of the support 1. The second end of the hub 4 may, e.g., be directed towards a camera or other type of measurement device of the navigation system used to determine the location of the support 1 and any device connected to the support 1.

As can be seen in FIGS. 1*a*, 1*d* and 1*e*, the hub 4 comprises at least one guide surface 8 extending at least partially between the reference surface 6 and the deflectable element 7. For example, the guide surface 8 may extend from the reference surface 6 towards the deflectable element 7. The guide surface 8 can provide stability of the support 1 in the transverse direction when the deflectable element 7 is deflected.

As can be seen in FIGS. 1*a*-1*e*, the hub comprises a snap-fit feature 9 to lock the support to another device, such as the holder 20. The snap fit feature 9 may be located at the deflectable element 7.

In the illustrated embodiments, the deflectable element 7 has a base and a free end. The free end may have a top surface 10. The base is connected to the body 2. In an unloaded or non-deflected state, the deflectable element 7 extends in the axial direction of the hub 4, such as substantially parallel to the central longitudinal axis 5 from the base towards the second end of the hub 4. The height of the deflectable element 7, measured from the base to the free end and in the axial direction of the hub 4, e.g. parallel to the central longitudinal axis 5, may be varying in the tangential direction of the hub 4. The varying height provides a sloping top surface 10 (FIG. 1*e*) of the deflecting element 7 in the tangential direction of the hub 4, i.e. around the central longitudinal axis 5 of the hub 4. This may contribute to applying a force to and deflect the deflecting element 7, which in turn adds stability to the support in the axial and transverse directions of the support 1 when assembled, as will be discussed below.

Furthermore, in some embodiments the free end of the deflectable element 7 may be positioned at least partially eccentrically, i.e. at a varying radial distance from the central longitudinal axis 5 of the hub 4, around the central longitudinal axis 5. This may also applies an increased the force on the deflectable element 7 and adds stability to the support when assembled. The sloping top surface 10 and the eccentrically position of the free end may be used in combination or separately, wherein each aspect adds to the stability of the support 1 when assembled.

The top surface 10 of the free end of the deflectable element 7 may face away from the reference surface 6, and be inclined inwardly towards the central longitudinal axis 5. This provides for reduced wear on the top surface 10 when assembled. Hence, if the support 1 is assembled and disassembled with the holder 20 multiple times, the risk of deforming or scraping of material from the top surface 10 is reduced and the shape of the top surface 10 is maintained, which contributes to consistent stability of the support also when assembled/disassembled multiple times. It also makes the assembly process easier with reduced friction between mating surfaces of the assembly of the support 1 and the holder 20.

In the embodiments of FIGS. 1*a*-1*e*, the snap-fit feature 9 comprises a depression, such as a v-shaped depression, which may extend from the free end 10 of the deflectable element 7 towards the first end of the hub 4. In other embodiments, the snap fit feature is a u-shaped depression. Still other shapes are foreseeable. With the v-shaped depression, the snap fit feature 9 comprises two flanks, which may contribute to stability as will be further explained below.

As disclosed above, the reference surface 6 is located at a first end of the hub 4 and is radially positioned a first distance from the central longitudinal axis 5, and the deflectable element 7 that is located at a second end of the hub 4 and is radially positioned a second distance from the central longitudinal axis 5. In some embodiments, the first distance is different from the second distance. This adds stability to the support, since forces will be directed, from the deflectable element 7 towards reference surface 6, inwardly/outwardly relative to the central longitudinal axis 5. In the embodiments illustrated in FIGS. 1*a*-1*e*, the first distance is smaller than the second distance, which adds stability at the same time as a compact design at the distal end may be achieved, wherein the support 1 and holder 20 are easy to assemble.

In some embodiments, the guide surface 8 comprises a first portion and a second portion. The first portion may have a cylindrical cross-section along to the axial direction of the hub 4, and the second portion may have a conical cross-section along to the axial direction of the hub 4, or vice versa. The shape of the first portion and the second portion may be complementary to the shape of mating surfaces of the holder 20. Having the conical cross-section adds stability as the support 1 is pushed towards the distal end of the holder 20 when assembled as will be discuss below, whereas the cylindrical cross-section provides for the support 1 not jamming on the holder 20 and therefore provides easier disassembly.

As can be seen in FIG. 1a, the hub 4 may comprise at least one slot 11 having an open end towards the central longitudinal axis 5 and having a closed end towards a periphery of the hub 4. The closed end may be located closer to the periphery of the hub 4 than at least a portion of the deflectable element 7. The slot 11 may extend through the guide surface 8, wherein the guide surface 8 is separated into multiple sections along the longitudinal axis 5 of the hub 4. The slot 11 provides an entry for a portion of the holder 20, as will be described below. In the embodiments of FIGS. 1a-1e, the slot 11 comprises side surfaces extending in the radial or transverse direction of the hub 4 from the open end to the closed end.

A stop member 12 may be located at the depression. The depression 9 may be located between the stop member 12 and the top surface 10 of the deflectable element 7. The stop member 12 may have a height that is higher than the height of the top surface 10. Additionally, the stop member may have a thickness that is thicker than the thickness of the remaining part of the deflectable element 7. This provides for reduced deflectability of the deflectable element 7 at the stop member 12 than at the opposing side of the delfectable element 7, which in turn may increase the force applied to the support 1 and enhance stability. Hence, the stop member 12 may have dual functionalities. However, the stop member 12 may have the same thickness as the remaining part of the deflectable element 7 in other embodiments.

The base of the deflectable element 7 is in the illustrated embodiments attached to the base 2 of the support 1 between side surfaces of neighboring slots 11. The slots 11 provide additional flexibility to the deflectable element 7, as the portion of the base between slots 11 can be tilted up/down in the longitudinal direction of the hub 4 as the deflectable element 7 is pushed outward/inward when assembled/disassembled. This further contributes to the stability as well as to easy assembly/disassembly of the support 1.

The body 2 may have a plurality of arms positioned around the hub, each arm having the region 3 for the marker. The number and the length of the arms 12/distance between regions 3 for markers may vary depending on desired accuracy and number of degrees of freedom to track. In the exemplifying embodiments, the number of arms 12 is four with a single region 3 for a marker at the tip of each arm. However, the number of arms, and the number of regions 3 for markers on each arm, as well as the pattern formed by the regions may be different. The exact shape of the arms 12 and the patterns formed by the regions 3 are only examples in the embodiments of FIGS. 1a-1e.

The material thickness of the base 2 and the hub 4 may be sized to provide the deflection of the deflecting element 7, as described herein, while the regions 3 for marker remains intact and does move relative to the reference surface 6 during the deflection. This provides for a fixed relationship between each marker and the holder 20 when the support 1 is mounted to the holder. For example, the deflection of the free end 10 may be in the range of a few millimeters or less.

The Holder

FIGS. 2a-2c illustrate the holder 20, e.g. for the support 1 according to embodiments as described above. The holder 20 is designed to have an at least partially complementary shape to the support 1 such that the support 1 can be mounted to the holder 20 in a stable fashion. The holder 20 as such can be permanently or removably mounted onto other devices, such as instruments. Hence, the other devices can be accurately tracked in space by tracking the support. Mounting of the holder on other instruments is e.g. described in WO2019/164441 (wherein the holder is denoted "head") by the applicant of the present application, which is incorporated herein in its entirety by reference.

The holder 20 comprises a ledge 21 extending in a radial or transverse direction of the holder 20. The ledge 21 may extend partially or completely around the circumference of the holder 20. The ledge 21 provides a support against which the reference surface 6 may abut and be positioned in a fixed predetermined position when the support 1 and the holder 20 are assembled. The ledge 21 may be centered around a longitudinal axis 22 of the holder. The extension of the ledge 20 in the transverse direction may be sized to have the same or a larger width as the width of the reference surface 6 of the support 1.

The holder 20 comprises at least one arm 23 extending in the radial or transverse direction of the holder 20. A guide surface 24 extends at least partially between the ledge 21 and the arm 23. The guide surface 24 of the holder 20 may be centered around the longitudinal axis 22 of the holder 20. Also, the guide surface 24 of the holder may be sized and shaped to have a tight fit, such as a sliding or location fit, with the guide surface 8 of the support 1. Hence, the guide surface 24 of the holder 20 may comprise a first portion with a conical cross section along the longitudinal axis 22 of the holder 20 and a second section with a cylindrical cross section along the longitudinal axis 22, or vice versa.

The arm 23 may be spaced apart from the ledge 21 along the longitudinal axis 22 of the holder 20. Furthermore, the arm 23 comprises a sliding surface 25 that may be inclined in a non-perpendicular direction relative to an axial direction along the longitudinal axis 22 of the holder 20. This provides for a stable mounting of the support 1 to the holder 20, as will be further described below.

The sliding surface 25, such as the tip thereof, may be rounded in the tangential direction of the holder 20. Such a shape can be positioned in a u-shaped or v-shaped snap-fit feature. The radius of the sliding surface 25 and a v-shaped depression 9 of the support 1 may be dimensioned such that the sliding surface 25 abuts the flanks of the depression 9, but not the tip of the sliding surface 25, which is spaced apart from the tip/deepest part of the depression 9. Hence, the arm 23 will be supported by two separated surfaces adding stability to the assembly of the support 1 and the holder 20.

The arm 23 may have a base and a free end. The sliding surface 25 may extend at least partially between the base and the free end and have a first region and a second region. The first region may be being located closer to the base than the second region. A first axial distance, measured from a distal part of the first region to the ledge 21, may be shorter than a second axial distance, measured from a distal part of the second region to the ledge 21. Said differently, the sliding surface 25 may be inclined relative a transverse axis of the holder, i.e. an axis perpendicular to the longitudinal axis 22 of the holder 20. The inclination may be such that the base of the arm 23 is located closer to the ledge 21 than the free end of the arm 23. Furthermore, the sliding surface 25 and the free end of the deflectable element 8 may be sized such that the sliding arm abuts the free end of the deflectable element 8 when the support 1 and the holder 20 are assembled. Hence, the support 1 may be held between the sliding surface 25 and the ledge 21 when assembled with the holder 20. Furthermore, a distance between the sliding surface 25 and the ledge 21 may be sized to be at least partially larger than a first distance between the reference surface 6 and the free end of the deflectable element 7 at the slot 11. The distance between the sliding surface 25 and the ledge 21 may be smaller than a second distance between the reference surface 6 and the free end of the deflectable element 7 closer to the depression 9, or even measured at the deepest position of the depression 9. This provides for easy assembly of the support 1 and the holder 20 while the deflectable element 7 can be deflected outwards away from the central longitudinal axis 5 when the support 1 and the holder 20 are assembled. Furthermore, deflecting the deflectable element 7 during assembly provides a force to the support 1, which enhances stability. However, deflecting the deflectable element 7 is not necessary in all embodiments. Instead, a sliding or location fit between the sliding surface 25 and the deflectable element 7 may be provided.

The sliding surface 25 may have a crest forming the distal part of the first region and the distal part of the second region. The crest may be straight between the first region and the second region and may be inclined relative to the radial or transverse direction of the holder 1. This provides for reduced friction between the the sliding surface 25 and the free end of the deflectable element 7, with reduced risk of deformation and damage of the deflectable element 7, as discussed above.

A base 26 or distal end of the holder 20 may be inclined relative to the longitudinal axis 22 and/or the ledge 21, as is illustrated in the embodiments of FIGS. 2b and 2c. However, the base 26 or distal end of the holder 20 may be parallel with the ledge 21 in other embodiments. Hence, the region 3 for the marker may be parallel or tilted relative to the base 26 of the holder 20.

The holder 20 may be made in a material that is more rigid than the material of the support 1, such as titanium or stainless steel. Hence, the arm 23 may rigid and not deflect as the deflectable element 7 deflects as is described herein.

Assembly with Support and Holder

In order to assembly the support 1 and the holder 20, the longitudinal axis of the support 5 is aligned with the longitudinal axis 22 of the holder 20. The holder 20 is rotated around its longitudinal axis 5 to align the slot 11 with the arm 23 of the holder. The guide surface 8 of the support 1 is guided along the guide surface 24 of the holder 20. The guide surface 8 of the support 1 and the guide surface 24 of the holder 20 are sized such that the arm 23 has clearance from the side surfaces of the slot. The support 1 is guided along the guide surface 24 of the holder until the reference surface 6 abuts the ledge 21 of the holder 20. This provides a stable assembly in the axial direction of the support 1 and holder 20. Then, the support 1 is rotated relative the holder 20, with the sliding surface 24 abutting the free end of the deflecting element 7. This provides a fixed position of the support 1 relative to the holder in the axial direction of the assembly. The abutment/sliding or location fit between the guide surface 8 of the support 1 and the guide surface 24 of the holder 20 prevents tilting of the support 1 relative the holder 20, i.e. provides stability in a direction transverse to the longitudinal axis of the assembly. The tighter fit the more stable connection. Furthermore, in case the free end of the deflectable element 7 is sloping and the sliding surface is tilted relative to the transverse axis of the holder 20 as described above, the deflectable element 7 is deflected outwardly away from the longitudinal axis providing a force from the arm 23 to the support 1, wherein the support 1 is firmly attached between the arm 23 and the ledge 21 and adds stability in the axial and transverse direction. The support 1 may be rotated until the arm snaps into the snap-fit feature 9 in an assembled position. In the assembled position, the distance between the arm 23 and the ledge 21 may be sized such that the deflectable element 7 is deflected outwards. Hence, the force may be provided also in the fully assembled position of the support 1 to the holder 20, which adds further stability and prevents inadvertent disassembly. In order to disassemble the support 1 from the holder 20, the process is reverted.

In case the support has multiple slots 11 and the holder 20 has multiple arms, one or several slots 11/arms 23 may have a larger width than the other slot(s) 11/arm(s) 23, where the wider arm 23 may be sized to have clearance to a correspondingly sized slot 11 but be too large for passing through at least one of the smaller slots 11. This provides for assembling the support 1 only in one rotational direction relative to the holder 20.

As mentioned above, the support 1 may have one or several stop members 12, such as one stop member for each depression 9. The stop member may prevent the arm 23 and the sliding surface 24 from being rotated too far, beyond the depression 9 when assembled. The stop member 12 may also prevent incorrect disassembly of the support 1 and the holder 20 by rotating the support 12 in the wrong direction relative the holder 20. Furthermore, the stop member 23 may be located at a side surface of the slot 11, such as be an extension of the side surface. This provides for preventing rotating the support 1 in the wrong direction during assembly, as the height of the stop member 12 is higher than the top surface 10 of the deflectable element 7.

In the illustrated embodiments in FIGS. 1a-1e, and FIGS. 2a-2c, the support has three sets of the deflecting elements 7, slots 11, guide surfaces 8, reference surfaces 6, and snap-fit features 9, and the holder 20 has a corresponding number of mating elements. This provides enhanced stability over a having a single deflecting element 7, slot 11, guide surface 8, reference surface 6, and snap-fit feature 9, and a holder 20 with a single of each mating element. However, in some embodiments where less accuracy is desired in the navigation system, embodiments with a single of each of these features provide sufficient accuracy. The embodiments with three sets are particularly useful in situations where high accuracy, such as sub-millimeter accuracy, is desired. The design of the support 1 and the holder 20 with the location and/or sliding fit as described above has the capacity to provide a stability that enables accuracy in the low sub-millimeter range for a navigation system, such as an optical navigation system used for surgical navigation. Such systems can be used for navigating instruments and implants with a corresponding accuracy relative to patient anatomy.

As will be apparent, the features and attributes of the specific embodiments disclosed above may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

The invention claimed is:

1. A support for at least one marker for a navigation system, comprising:
   a body having at least one region for said at least one marker, and
   a hub for attaching said support to a holder, said hub comprising
   a central longitudinal axis defining an axial direction of the hub;
   at least one reference surface located at a first end of the hub and radially positioned a first distance from the central longitudinal axis;
   at least one deflectable element at a second end of the hub and radially positioned a second distance from the central longitudinal axis;
   at least one guide surface extending at least partially between the reference surface and the deflectable element; and
   a snap-fit feature located at the deflectable element, wherein the snap-fit feature comprises a V-shaped depression.

2. The support according to claim 1, wherein the deflectable element has a base and a free end, the base is connected to the body, and the deflectable element extends in the axial direction of the hub.

3. The support according to claim 2, wherein the height of the deflectable element, measured in the axial direction of the hub from the base to the free end, is varying in the tangential direction of the hub.

4. The support according to claim 1, wherein a free end of the deflectable element is positioned at least partially eccentrically around the central longitudinal axis.

5. The support according to claim 4, wherein a top surface of said free end is inclined towards the reference surface and towards the central longitudinal axis.

6. The support according to claim 1, wherein the first distance is different from the second distance.

7. The support according to claim 6, wherein the first distance is smaller than the second distance.

8. The support according to claim 1, wherein the guide surface comprises a first portion and a second portion, the first portion having a cylindrical cross-section in the axial direction of the hub, and the second portion having a conical cross-section in the axial direction of the hub.

9. A support for at least one marker for a navigation system, comprising:
   a body having at least one region for said at least one marker, and
   a hub for attaching said support to a holder, said hub comprising—
   a central longitudinal axis defining an axial direction of the hub;
   at least one reference surface located at a first end of the hub and radially positioned a first distance from the central longitudinal axis;
   at least one deflectable element at a second end of the hub and radially positioned a second distance from the central longitudinal axis;
   at least one guide surface extending at least partially between the reference surface and the deflectable element; and
   a snap-fit feature located at the deflectable element;
   wherein the hub comprises at least one slot having an open end towards the central longitudinal axis and having a closed end towards a periphery of the hub, wherein the closed end is located closer to the periphery of the hub than at least a portion of the deflectable element.

10. The support according to claim 1, wherein said body comprises a plurality of arms positioned around the hub, each arm having a region for a marker.

11. A support for at least one marker for a navigation system, comprising:
   a body having at least one region for said at least one marker,
   a holder; and
   a hub for attaching said support to the holder, said hub comprising—
   a central longitudinal axis defining an axial direction of the hub;
   at least one reference surface located at a first end of the hub and radially positioned a first distance from the central longitudinal axis;
   at least one deflectable element at a second end of the hub and radially positioned a second distance from the central longitudinal axis;
   at least one guide surface extending at least partially between the reference surface and the deflectable element; and
   a snap-fit feature located at the deflectable element;
   wherein the holder comprises:
   a ledge extending in a transverse direction of the holder;
   at least one arm extending in the transverse direction of the holder; and
   a guide surface extending at least partially between the ledge and the arm; wherein
   the arm is spaced apart from the ledge; and
   the arm comprises a sliding surface that is inclined in a non-perpendicular direction relative to an axial direction of the holder.

12. The support according to claim 11, wherein the sliding surface is rounded in the tangential direction of the holder.

13. The support according to claim 12, wherein the arm has a base and a free end, and the sliding surface extends at least partially between the base and the free end and has a first region and a second region, the first region being located closer to the base than the second region, and wherein a first axial distance, measured from a distal part of the first region to the ledge, is shorter than a second axial distance, measured from a distal part of the second region to the ledge.

14. The support according to claim 13, wherein the sliding surface has a crest forming the distal part of the first region and the distal part of the second region, and wherein the crest is straight between the first region and the second region and is inclined relative to the transverse direction of the holder.

15. A support for at least one marker for a navigation system, comprising a body having at least one region for said at least one marker and a central hub formed around a central longitudinal axis, the central hub defining a central opening around said central longitudinal axis configured to receive a holder, wherein said central hub comprises:
  at least one reference surface located at a first end of the hub adjacent the central opening in a fixed position relative to said at least one region, the at least one reference surface configured as a positive stop for the holder when inserted through the central opening; and
  a holder latching mechanism formed in the hub at a second end opposite the first end, the holder latching mechanism configured to bias a holder reference surface into contact with said at least one reference surface when the holder is inserted through the central opening.

16. The support according to claim 15, wherein the latching mechanism comprises:
  at least one deflectable element at a second end of the hub and radially positioned a second distance from the central longitudinal axis and for being deflected by a sliding surface of an arm of the holder;
  at least one support guide surface extending at least partially between the reference surface and the deflectable element and for being guided by a holder guide surface of the holder; and
  a snap-fit feature located at the deflectable element.

17. The support according to claim 16, wherein the hub comprises at least one slot having an open end towards the central longitudinal axis and having a closed end towards a periphery of the hub, wherein the closed end is located closer to the periphery of the hub than at least a portion of the deflectable element.

18. The support according to claim 15, in combination with said holder, wherein said holder comprises an elongate body defining said holder reference surface spaced from a first end, said first end configured to be received through said central opening to engage said latching mechanism.

19. The support according to claim 18, wherein said holder further comprises:
  a ledge forming said holder reference surface extending in a transverse direction of the holder;
  at least one arm extending from the first end of the holder in the transverse direction of the holder; and
  a holder guide surface extending at least partially between the ledge and the arm and for guiding at least one support guide surface of the support.

* * * * *